SONIC DISPLACEMENT TRANSDUCER

Original Filed July 20, 1966 2 Sheets-Sheet 1

INVENTOR.
JACOB TELLERMAN

By J. Patrick Caymey

ATTORNEYS

SONIC DISPLACEMENT TRANSDUCER

Original Filed July 20, 1966 2 Sheets-Sheet 2

United States Patent Office

Re. 26,774
Reissued Jan. 20, 1970

26,774

SONIC DISPLACEMENT TRANSDUCER

Jacob Tellerman, Bayside, N.Y., assignor to Kollsman Instrument Corporation, Elmhurst, N.Y., a corporation of New York Original No. 3,371,536, dated Mar. 5, 1968, Ser. No. 566,618, July 20, 1966. Application for reissue Jan. 2, 1969, Ser. No. 793,208

Int. Cl. G01t 7/12

U.S. Cl. 73—386 15 Claims

Matter enclosed in heavy brackets [ ] appears in the original patent but forms no part of this reissue specification; matter printed in italics indicates the additions made by reissue.

*ABSTRACT OF THE DISCLOSURE*

*A displacement transducer utilizes an aneroid capsule connected to opposite ends of a curved wire to cause capsule displacements to alter the curvature of the wire. Sonic reflecting masses are provided at opposite ends of the wire to define a sonic reverberation path through the wire, the masses being connected to the walls of the capsule. Magnets are located at spaced points along the wire and are energized to produce torsional mode sound waves having a speed of propagation through the wire that is a function of the wire curvature and therefore of the capsule displacement. The speed of propagation is measured by determining the resonant oscillating frequency of the torsional sound waves in the reverberation path.*

This invention relates to a displacement transducer, and more specifically relates to a novel transducer for generating an electrical signal in response to the change in the radius of curvature of a rod which causes a change in the velocity of sound in the rod.

It is known that the velocity of sonic waves in a curved rod will vary if the radius of curvature of the rod is changed.

In accordance with the present invention, which can have particular application to the measurement of the displacement of an aneroid capsule for use, for example, in aircraft instruments, a curved wire is clamped at its both ends to large sonic reflecting masses, at least one of which is movable through a distance which is to be measured. This change in configuration of the wire will then change the velocity of sonic wave propagation through the wire, and means are provided for measuring parameters functionally related to sonic wave progagation, thereby to measure the displacement of the end of the wire.

In accordance with one embodiment of the invention, the curved wire which can have any desired curvature such as a circular curvature or an S-shaped curvature, or the like, is forced into torsional resonance mode. The frequency of torsional resonance, which is related to the velocity of sound propagation in the wire, is then changed by varying the curvature of the wire by moving at least one of its ends over a distance which is to be measured. This will then change the frequency of torsional resonance, even though the effective length of the wire remains constant.

In one embodiment of the invention, the reflecting blocks which receive the ends of the wire are connected to the opposite walls of an aneroid capsule used in aircraft-type instruments where the aneroid capsule expands or contracts responsive to pressure changes. This expansion and contraction, which is a measure of the pressure differential applied to the aneroid capsule, will then be reflected as varying torsional resonance frequencies of the wire whose curvature is being adjusted by the movement of the capsule walls. This frequency can then be displayed on a suitable indicator in digital form, if desired, thereby to form an extremely simple and highly accurate displacement measuring structure which could be calibrated in terms of air pressure differentials, or the like.

In order to cause the wire to oscillate in a torsional mode, an arrangement based on the so-called Wiedmann effect may be used, wherein the rod is formed of a suitable ferromagnetic material which has an electric current therethrough and also has a unidirectional magnetic field directed along the axis of the rod. If the current applied to the rod is sinusoidal, the wire will oscillate about its axis with a torsional mode of oscillation. Suitable control circuitry can be provided to cause the wire to oscillate at its resonant frequency through the use of a suitable regenerative circuit arrangement in which the frequency of the A-C cutter causing the torsional oscillation is adjusted by a suitable circuit means to the resonant torsional frequency of the wire. A second circuit is then coupled to the torsionally oscillating curved wire which uses the converse of the Wiedmann effect transducer, wherein the wire is oscillated in a constant magnetic field, thereby to induce a Wiedmann current which can be used to control the driving current frequency. Clearly, however, any suitable electrical driving circuit could be used to sustain either torsional vibration of the wire or to directly measure the speed of sound in the wire as the wire curvature is changed to obtain a measure of the displacement of the wire ends.

Accordingly, a primary object of this invention is to provide a novel displacement transducer which can measure extremely small displacements with high accuracy.

Another object of this invention is to provide a novel displacement transducer which provides highly reproducible outputs for given input motions.

Still another object of this invention is to provide a novel displacement transducer especially adapted for use in aircraft instruments for directly measuring the expansion or contraction of an aneroid capsule.

These and other objects of this invention will become apparent from the following description when taken in connection with the drawings, in which:

FIGURE 1 schematically illustrates in perspective view a curve wire or rod terminating at either end on a respective sonic reflecting mass, one of which is movable.

Figure 1:
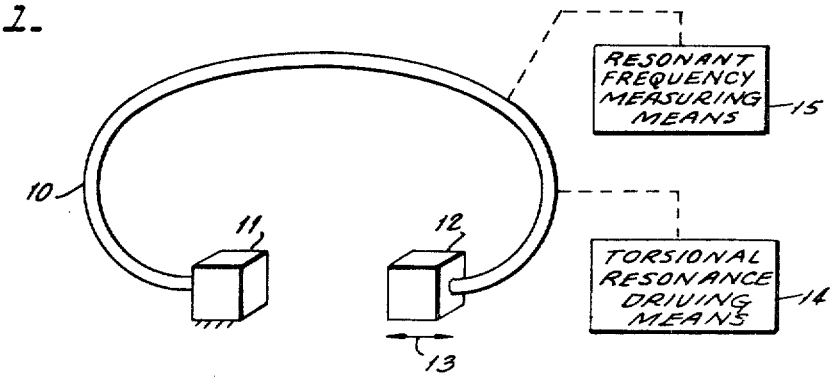

Referring first to FIGURE 1, there is illustrated therein a curved rod 10 of a sound conductive material which is clamped at either end to the sonic reflecting masses 11 and 12. Mass 11 is shown as a fixed mass, while the mass 12 is shown as being movable toward or away from mass 11 in the direction of arrow 13, thereby to alter the curvature of rod 10.

In accordance with the invention, and recognizing that the velocity of sound through rod 10 will change with a change in curvature of rod 10, means are connected to rod 10 for measuring the sonic velocity therein which will be functionally related to the curvature of rod 10, and thus the position of reflecting mass 12.

One manner in which this measurement can be made is schematically illustrated in FIGURE 1 by block 14 connected to rod 10 and adapted to oscillate rod 10 about its axis in a torsional resonance mode. A suitable frequency measuring means for measuring the resonant frequency of rod 10 is then provided by block 15 which could take any desired form.

In operation, a change in position of reflecting block 12 will change the speed of sound in rod 10 and will thereby change its torsional resonance frequency. Therefore, a measurement of the torsional resonance frequency will be related to the position of mass 12.

Figure 2:
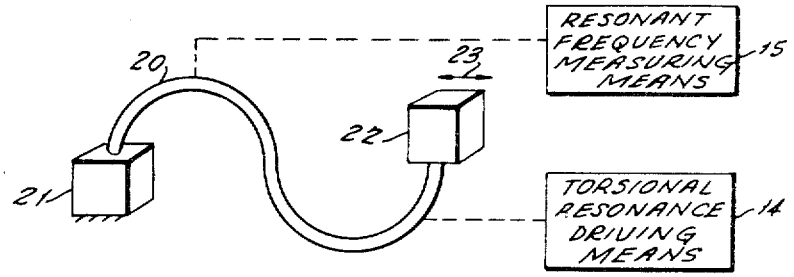
FIGURE 2 is a modification of the arrangement of FIGURE 1 wherein the curved rod has an S-shape rather than the circular shape of FIGURE 1.

While FIGURE 1 illustrates the invention for a circularly curved rod 10, it should be understood that any curvature could be used. For example, FIGURE 2 illustrates the use of an S-shaped rod 20 which is clamped between a fixed reflecting block 21 and a movable reflecting block 22 which is movable in the direction of arrow 23. Once again, as the block 22 is moved, the speed of sound in rod 20 and thus its torsional resonance frequency will be changed, with this change measurable by the resonant frequency measuring means 15.

Figure 3:
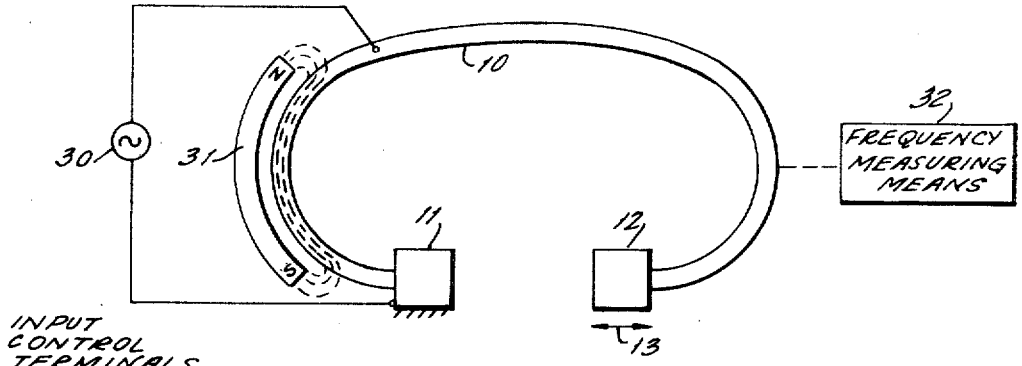
FIGURE 3 illustrates the manner in which a permanent magnet and voltage source can be connected to the wire of FIGURE 3 to cause it to oscillate in a torsional mode of oscillation by virtue of the Wiedmann effect.

One manner in which torsional resonance can be induced in the rod 20 is illustrated in FIGURE 3 which shows the application of a Wiedmann effect type arrangement to the structure of FIGURE 1.

In accordance with the Wiedmann effect, a ferromagnetic rod can be mechanically twisted by introducing an electric current through the rod and a magnetic field along the axis of the rod. Thus, a twisting or torsional force can be introduced into one half of wire 10 by connecting a suitable voltage source 30 in series with the left-hand portion of wire 10 and by placing a permanent magnet 31 adjacent wire 10 such that a magnetic flux will be directed along the axis of wire 10 and parallel to the flow of current through wire 10 from source 30. Note that wire 10 may be of any ferromagnetic material, and good results have been obtained when using a wire of Ni-Span C material.

A frequency measuring means 32 connected to the bar will then measure a frequency of torsional oscillation which is functionally related to the torsional oscillation frequency of wire 10.

In order to sustain oscillation in the bar 10, a voltage pickoff or suitable mechanical-to-electrical converter can be provided which is regeneratively applied to the torsional resonance driving circuit including members 30 and 31 of FIGURE 3.

Figure 4:
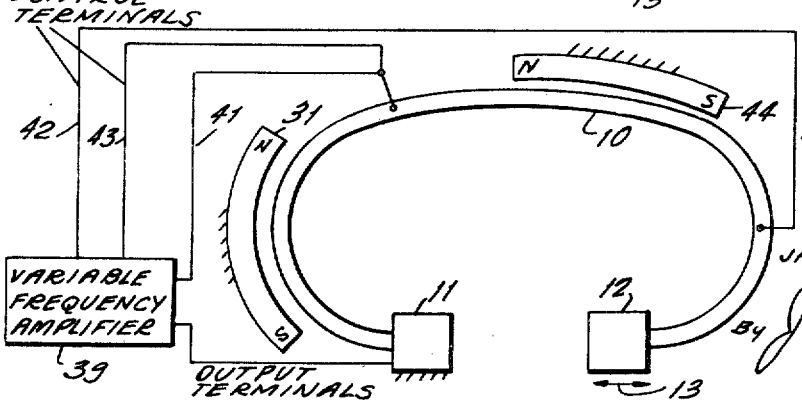
FIGURE 4 is a similar to FIGURE 3 and illustrates the placement of a pickoff circuit which is regeneratively connected to an amplifier supplying the current which causes the rod to oscillate in its torsional mode.

This is illustrated in FIGURE 4 where components similar to those of FIGURE 3 have similar identifying numerals. In FIGURE 4, however, the voltage source 30 of FIGURE 3 is replaced by a suitable variable frequency amplifier 39 having output conductors 40 and 41 connected to the left half portion of rod 10. Variable frequency amplifier 39 then has input conductors 42 and 43 which control its output frequency with conductors 42 and 43 connected to a portion of wire 10 removed from the electrical circuit included in the output conductors 40 and 41.

A second permanent magnet 44 is then arranged parallel to this second portion of rod 10, whereby magnet 44 and a torsionally oscillating portion of wire 10 adjacent thereto will induce a Wiedmann current in this portion of wire 10 which is connected to terminals 42 and 43. Therefore, the wire 10, which attempts to oscillate at its resonant frequency, will deliver a signal to the input of amplifier 39 over input conductors 42 and 43 which will cause amplifier 39 to adjust its output frequency until the output current at conductors 40 and 41 along with magnet 31 will always drive wire 10 at its resonant torsional frequency.

This resonant torsional frequency, however, will be dependent upon the particular displacement of reflecting mass 12, and thus the curvature of rod 10, so that the output frequency of amplifier 39 will be functionally related to the displacement of mass 12.

Figure 6:
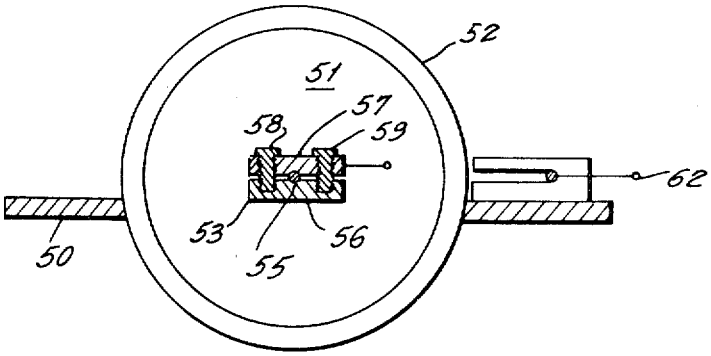
FIGURE 6 is a cross-sectional view of FIGURE 5 taken across the lines 6—6 in FIGURE 5.
Figure 5:
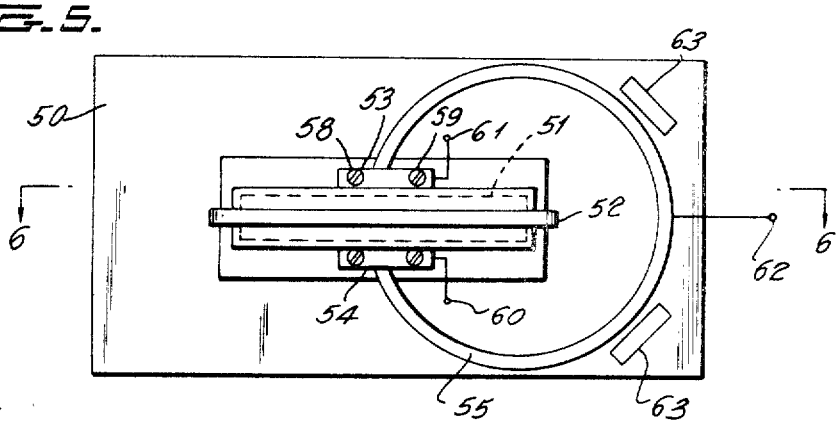
FIGURE 5 is a top plan view of an aneroid capsule which is connected to vary the curvature of a rod of the type shown in FIGURE 4.

FIGURES 5 and 6 illustrate the application of the present invention to the measurement of the deflection of the walls of the aneroid capsule. Referring now to FIGURES 5 and 6, there is illustrated therein a support platform 50 which mounts an aneroid capsule 51 at its rim 52. The opposing walls of capsule 51 are free to expand and contract with varying conditions of differential pressure, and the center of the opposing walls carry sonic reflecting masses 53 and 54 which can take the shape of clamping blocks for clamping the two ends of curved rod 55.

More particularly, and as shown in FIGURE 6 for the case of reflecting mass 53, it will be seen that the mass 53 can be formed of two halves 56 and 57 which are clampable to the end of rod 55 by the clamping bolts 58 and 59.

Suitable terminals 60, 61 and 62 are then provided at each end of rod 55 and at the center of rod 55 for connection to a suitable driving and frequency measuring circuit in a manner similar to that shown in FIGURE 4. Suitable permanent magnets such as permanent magnet 63 are provided as needed, as illustrated in FIGURE 4.

In the embodiment of FIGURES 5 and 6, the circularly arranged rod 55 was formed of Ni-Span C wire having a diameter of .020 inch, a length of 7½ inches and bent to a radius of approximately 1 5/16 inches. The clamps 53 and 54 are constructed of brass and have a mass of approximately 2 grams and a size of about 3/16" x 6/16" x 1/8". A standard beryllium copper diaphragm used in aircraft instruments for measurement of pressure altitudes of from zero to 80,000 feet was used for the aneroid capsule 51. Pressure differentials corresponding to altitude changes from zero to 80,000 feet in altitude were then applied to capsule 51, and the frequency change in torsional rotation of bar 55 was measured from a reference frequency of 37,481 cycles per second. That is to say, the driving current connected between terminals 61 and 62 and the field strength of magnet 63 were initially adjusted to cause oscillation of rod 55, which was in an unstrained state when capsule 51 was at its sea-level altitude pressure, at 37,481 cycles per second. The pressure surrounding capsule 51 was then decreased to a pressure corresponding to 80,000 feet in altitude, and the capsule walls extended proportionally thereby moving clamping members 53 and 54 away from one another to increase the radius of bar 55.

Figure 7:
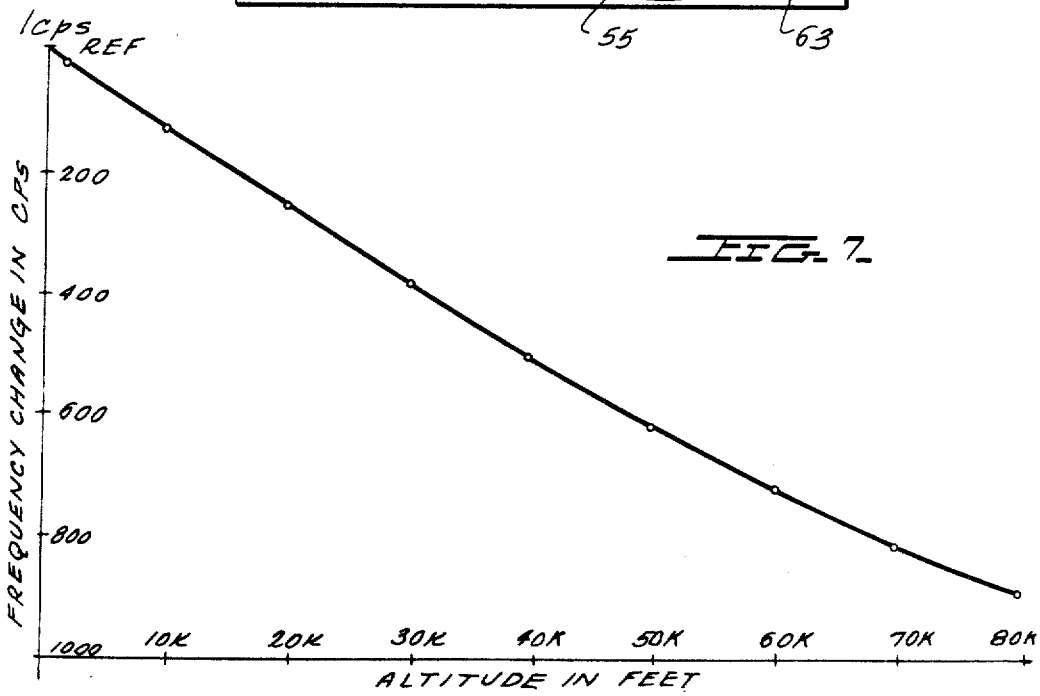
FIGURE 7 illustrates altitude pressure as a function of frequency change for the arrangement of FIGURES 5 and 6.

The frequency change measured for the torsional resonant frequency of rod 55 from zero to 80,000 feet is illustrated in FIGURE 7 where it is seen that a total frequency change of approximately 900 cycles from the reference frequency was measured. This frequency change was applied to a digital frequency meter which was calibrated in terms of altitude, whereby the entire instrument was useful as an altimeter having highly reproducible readings with a minimum of moving parts.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. A displacement transducer comprising a self-supporting resilient curved rod having a first and second end; a first and second sonic reflecting mass connected to said first and second ends, respectively; means for moving said first and second sonic reflecting masses with respect to one another to alter the curvature of said curved rod; and means for measuring the speed of sound in said rod connected to said rod; the relative displacement between said first and second sonic reflecting masses being functionally related to the speed of sound in said rod.

2. The device as set forth in claim 1 wherein said means for measuring the speed of sound in said rod includes means for inducing the torsional oscillation of said rod at its resonant oscillating frequency and means for measuring said oscillating frequency.

3. The device as set forth in claim 2 wherein said means for inducing torsional oscillation of said rod includes magnet means for passing a magnetic field through at least a portion of said rod and means for passing an adjustable frequency alternating current through said portion of said rod; said rod constructed of ferromagnetic material.

4. The device as set forth in claim 3 which includes second magnet means for introducing a magnetic field into a second portion of said rod and circuit means connected to said second portion of said rod receiving an induced current having the frequency of oscillation of said rod; and regenerative circuit means connecting said circuit means to said means for passing an adjustable frequency alternating current through said portion of said rod to adjust said adjustable frequency to the resonant frequency of said rod.

5. The device as set forth in claim 4 wherein at least one of said first and second sonic masses is connected to the wall of an aneroid capsule.

6. The device as set forth in claim 1 wherein at least one of said first and second sonic masses is connected to the wall of an aneroid capsule.

7. The device as set forth in claim 1 wherein said rod is circularly curved.

8. The device as set forth in claim 1 wherein said rod is curved in the form of an S-shape.

*9. A displacement transducer comprising an element of resilient rod-like material having a predetermined curved shape and having sonic reflecting means thereon to establish a reverberation path through the element, movable displacement means for altering the curvature of a rod portion of said element that is in said path, and means for measuring the speed of propagation of torsional mode sound waves through said rod portion as a function of a movement of said displacement means.*

*10. A displacement transducer in accordance with claim 9 and wherein said means for measuring speed includes means for inducing torsional oscillation of said rod portion at its resonant oscillating frequency and means for measuring said resonant oscillating frequency.*

*11. A displacement transducer in accordance with claim 9 and wherein said rod portion is of ferromagnetic material and said means for measuring speed includes means for inducing torsional oscillation comprising first magnet means providing a magnetic field through at least a region of said rod portion and means for passing an adjustable frequency alternating current through said region of said rod.*

*12. A displacement transducer in accordance with claim 11 and including second magnet means for providing a magnetic field through another region of said rod portion, first circuit means coupled to the last-named region of said rod portion to receive an induced current at the frequency of oscillation of said rod portion and regenerative circuit means connecting said first circuit means to said means for passing to adjust the frequency of said alternating current to the resonant frequency of said rod portion.*

*13. A displacement transducer in accordance with claim 9 and wherein said movable displacement means includes a wall of an aneroid capsule.*

*14. A displacement transducer in accordance with claim 9 and wherein said rod portion is circularly curved.*

*15. A displacement transducer comprising an element of resilient rod-like material having a predetermined curved shape; sonic reflecting means on the element to define a reverberation path through the rod-like element; means coupled to the rod-like element for producing torsional sound waves propagating therethrough; movable displacement means coupled to the rod-like element for altering the curved shape of said element; and means responsive to the torsional sound wave propagating through the element for producing a signal that varies in accordance with the speed of propagation of such waves.*

References Cited

The following references cited by the Examiner, are of record in the patented file of this patent or the original patent.

UNITED STATES PATENTS

| | | | |
|---|---|---|---|
| 3,101,001 | 8/1963 | Appleton | 73—517 XR |
| 3,327,533 | 6/1967 | Kooiman | 73—398 |
| 3,257,850 | 6/1966 | Kooiman | 73—398 |

DONALD O. WOODIEL, Primary Examiner

U.S. Cl. X.R.

73—398